United States Patent
Kim et al.

(10) Patent No.: US 10,091,756 B2
(45) Date of Patent: Oct. 2, 2018

(54) ELECTRONIC DEVICE, WIRELESS RELAY DEVICE, AND METHOD FOR PROVIDING LOCATION INFORMATION OF WIRELESS RELAY DEVICE

(71) Applicant: Samsung Electronics Co., Ltd., Gyeonggi-do (KR)

(72) Inventors: Jinseong Kim, Gyeonggi-do (KR); Kyounghan Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/992,374

(22) Filed: Jan. 11, 2016

(65) Prior Publication Data
US 2016/0205653 A1 Jul. 14, 2016

(30) Foreign Application Priority Data
Jan. 13, 2015 (KR) .......................... 10-2015-0004540

(51) Int. Cl.
*H04W 64/00* (2009.01)
*H04B 7/155* (2006.01)
(Continued)

(52) U.S. Cl.
CPC ............ *H04W 64/00* (2013.01); *H04B 7/155* (2013.01); *H04B 17/318* (2015.01); *H04W 4/02* (2013.01);
(Continued)

(58) Field of Classification Search
CPC ....... H04W 64/00; H04W 4/02; H04W 48/16; H04B 17/318; H04B 7/155
(Continued)

(56) References Cited

U.S. PATENT DOCUMENTS 7,149,504 B1 * 12/2006 Weaver ................. H04W 64/00
455/414.2
8,433,334 B2 4/2013 Huang et al.
(Continued)

FOREIGN PATENT DOCUMENTS

EP 1 174 728 A2 1/2002
KR 10-2010-0121903 A 11/2010
(Continued)

OTHER PUBLICATIONS

European Search Report dated Mar. 10, 2016.
PCT International Search Report dated Apr. 12, 2016.

*Primary Examiner* — Kamran Afshar
*Assistant Examiner* — Nicole Louis-Fils
(74) *Attorney, Agent, or Firm* — Cha & Reiter, LLC

(57) ABSTRACT

A wireless relay device according to various embodiments of the present disclosure may include a communication circuit that receives, from at least one electronic device, a location information message including the location information of the electronic device. A processor may confirm the reliability of the received location information of the electronic device if the location information satisfies at least one defined criterion. If the reliability is confirmed, the processor may approximate location information of the wireless relay device by using the location information with confirmed reliability, of the electronic device.

20 Claims, 10 Drawing Sheets

(51) Int. Cl.

| | | |
|---|---|---|
| *H04B 17/318* | (2015.01) | |
| *H04W 48/16* | (2009.01) | |
| *H04W 4/02* | (2018.01) | |
| *H04W 4/20* | (2018.01) | |
| *H04W 12/10* | (2009.01) | |
| *H04W 48/12* | (2009.01) | |
| *H04W 84/04* | (2009.01) | |

(52) U.S. Cl.
CPC ............ *H04W 4/20* (2013.01); *H04W 12/10* (2013.01); *H04W 64/003* (2013.01); *H04W 48/12* (2013.01); *H04W 48/16* (2013.01); *H04W 84/047* (2013.01)

(58) Field of Classification Search
USPC ................................. 455/456.1–457
See application file for complete search history.

(56) References Cited

U.S. PATENT DOCUMENTS

| | | | |
|---|---|---|---|
| 8,478,304 B1 | 7/2013 | David et al. | |
| 8,611,247 B2 | 12/2013 | Lakhzouri et al. | |
| 8,626,196 B2 | 1/2014 | Waters et al. | |
| 8,639,266 B2 | 1/2014 | Zelinka | |
| 8,706,140 B2 | 4/2014 | Alizadeh-Shabdiz | |
| 8,732,272 B2 | 5/2014 | Deshpande et al. | |
| 8,743,727 B2 | 6/2014 | Selvam et al. | |
| 8,744,352 B2 | 6/2014 | Pochop, Jr. | |
| 2002/0045455 A1 | 4/2002 | Spratt | |
| 2002/0163901 A1* | 11/2002 | Spratt | G01S 1/045 370/338 |
| 2006/0189313 A1* | 8/2006 | Kim | H04M 1/72544 455/435.1 |
| 2009/0270110 A1* | 10/2009 | Ardalan | H04B 1/3805 455/456.1 |
| 2010/0265140 A1 | 10/2010 | Sohn | |
| 2011/0035420 A1 | 2/2011 | Alizadeh-Shabdiz et al. | |
| 2012/0052884 A1 | 3/2012 | Bogatin | |
| 2012/0072106 A1 | 3/2012 | Han et al. | |
| 2012/0120929 A1 | 5/2012 | Avital et al. | |
| 2012/0327922 A1* | 12/2012 | Takahashi | G01S 5/0263 370/338 |
| 2013/0005386 A1 | 1/2013 | Kopikare et al. | |
| 2013/0102335 A1* | 4/2013 | Katagi | H04W 4/02 455/457 |
| 2013/0181867 A1 | 7/2013 | Sturdivant et al. | |
| 2013/0307723 A1 | 11/2013 | Garin et al. | |
| 2013/0324147 A1* | 12/2013 | Ong | H04W 64/00 455/456.1 |
| 2014/0057649 A1 | 2/2014 | Han et al. | |
| 2014/0179352 A1 | 6/2014 | V.M. et al. | |
| 2014/0341198 A1 | 11/2014 | Han | |
| 2014/0349674 A1 | 11/2014 | Colby et al. | |
| 2015/0257120 A1* | 9/2015 | Prechner | H04W 64/003 455/456.1 |
| 2016/0173623 A1* | 6/2016 | Broussard | H04L 63/107 713/168 |
| 2017/0111768 A1* | 4/2017 | Smith | H04W 4/023 |

FOREIGN PATENT DOCUMENTS

| | | |
|---|---|---|
| WO | 2010/129589 A1 | 11/2010 |
| WO | 2012/108591 A1 | 8/2012 |
| WO | 2014/101099 A1 | 7/2014 |

* cited by examiner

ELECTRONIC DEVICE, WIRELESS RELAY DEVICE, AND METHOD FOR PROVIDING LOCATION INFORMATION OF WIRELESS RELAY DEVICE

CLAIM OF PRIORITY

This application claims priority from and the benefit under 35 U.S.C. § 119(a) of Korean Patent Application No. 10-2015-0004540, filed on Jan. 13, 2015, which is hereby incorporated by reference for all purposes as if fully set forth herein.

BACKGROUND

1. Field

Various embodiments of the present disclosure relate to a wireless relay device that provides location information.

2. Description of the Related Art

Wireless Local Area Network (LAN) technology is based on the IEEE 802.11 standard. Wireless LAN technology, commonly referred to as Wi-Fi, is a wireless network technology used to support a wireless network in a Local Area, and may refer to a standard technology developed by the 11th Working Group of the IEEE 802 LAN/MAN Standards Committee. A user of an electronic device may access a Location Information System (LIS) through a wireless LAN in order to update the location information of the electronic device. The LIS may search for a location information storage server on the basis of information on the electronic device and provide the location information of the electronic device to the user.

SUMMARY

When an electronic device fails to access an LIS through a wireless relay device or cannot access the LIS owing to a firewall of the wireless relay device itself, the location information of the electronic device may not be updated.

Further, although the electronic device can access the LIS, the operations involved in accessing the LIS and then acquiring the location information therefrom may take too long and consume considerable electric power.

According to certain aspects of the present disclosure, the wireless relay device itself may store location information and thus, although electronic devices do not access the LIS, may provide the location information to the electronic devices.

A wireless relay device according to various embodiments of the present disclosure may include a communication circuit that receives, from at least one electronic device, a location information message including the location information of the electronic device. A processor may confirm the reliability of the received location information of the electronic device if the location information satisfies at least one defined criterion. If the reliability is confirmed, the processor may approximate location information of the wireless relay device by using the location information with confirmed reliability, of the electronic device.

An electronic device according to various embodiments of the present disclosure may include a communication circuit operable to transmit a location information request message, which requests location information of a wireless relay device, to the wireless relay device, and receive approximated location information of the wireless relay device transmitted in response to the location information request message. The approximated location information may have been approximated by the wireless relay device through use of location information of at least one other electronic device of which reliability has been confirmed via satisfaction of at least one defined criterion.

Methods that may be performed by the above devices are also disclosed.

A wireless relay device and method for providing the location information of the wireless relay device, according to various embodiments of the present disclosure may enable the wireless relay device to acquire the location information of the wireless relay device by using the location information of at least one electronic device located within a wireless network area, without accessing an LIS.

A wireless relay device and method for providing the location information of the wireless relay device according to various embodiments of the present disclosure may provide, without constructing a centralized system such as an LIS, the location information of the wireless relay device to an electronic device through the wireless relay device, and may allow the electronic device to quickly acquire the location information of the electronic device by using the location information of the wireless relay device.

A wireless relay device and method for providing the location information of the wireless relay device according to various embodiments of the present disclosure may enable the location information of an electronic device to be acquired by using the location information of a wireless relay device stored in the wireless relay device, even in a state of the absence of an application or the like, which is capable of accessing a location information service, in the electronic device.

A wireless relay device and method for providing the location information of the wireless relay device according to various embodiments of the present disclosure may enable an electronic device and a wireless relay device to transmit/receive location information through wireless LAN Medium Access Control (MAC) communication, thereby acquiring the location information of the electronic device in a short time and with low electric current consumption.

BRIEF DESCRIPTION OF THE DRAWINGS

The above features, and advantages of the present invention will be more apparent from the following detailed description in conjunction with the accompanying drawings, in which.

DETAILED DESCRIPTION

Figure 1:
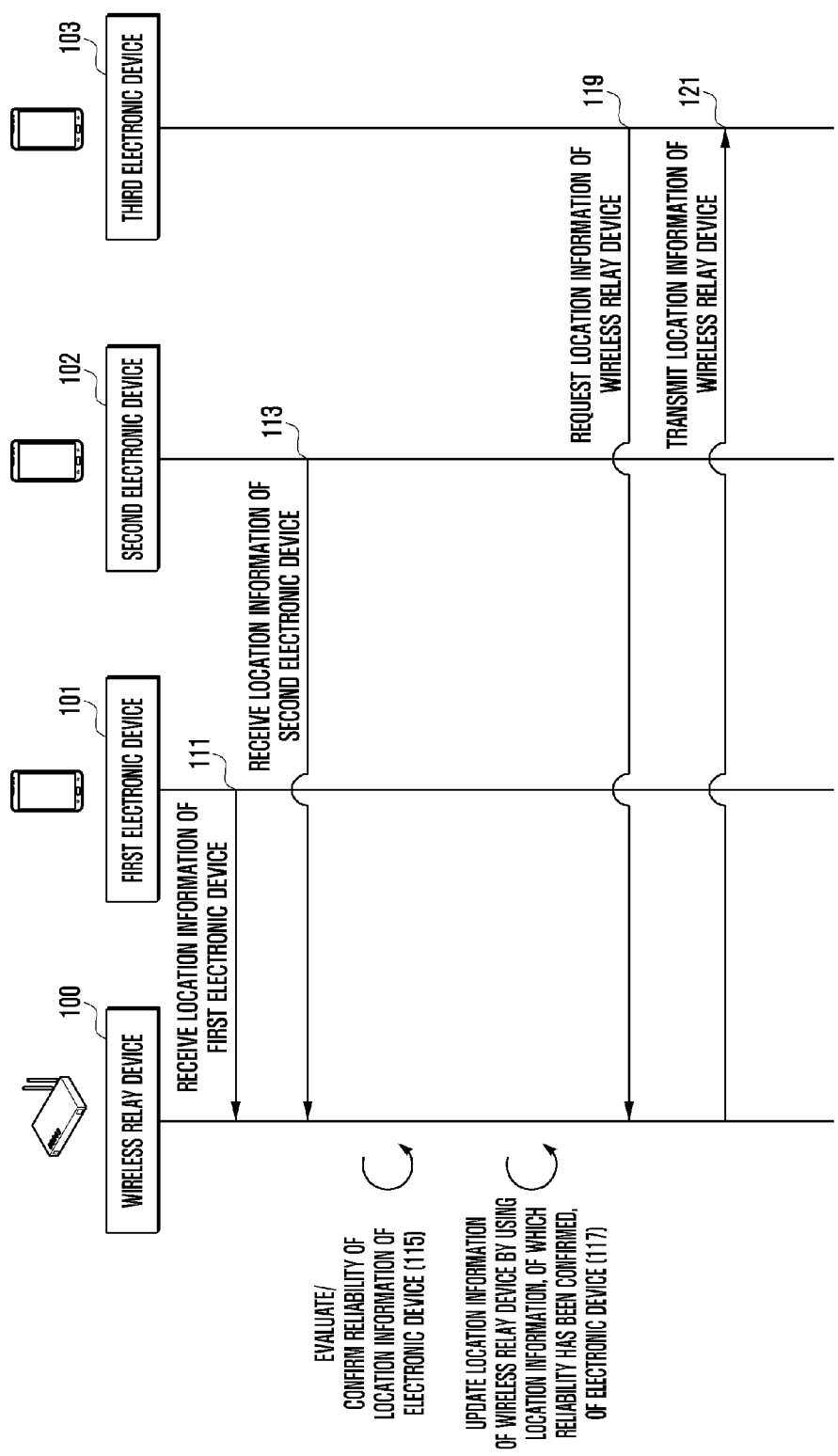
FIG. 1 is a signal flow diagram illustrating a wireless network environment and method in which a wireless relay device according to various embodiments of the present disclosure updates the location information thereof by using the location information of at least one electronic device and transmits the updated location information thereof to another electronic device.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the claimed subject matter as defined by the appended claims to the specific embodiments illustrated. The same or like reference numbers are used throughout the drawings to refer to the same or like parts.

An expression "comprising", "may comprise", "comprises", "comprising" used in the present disclosure indicates presence of a corresponding function, operation, element, presence of a characteristic, numeral, step, operation, element, component, or combination thereof described in a specification and does not limit additional at least one function, operation, element presence of a characteristic, numeral, step, operation, element, component, or combination thereof described in a specification. The present disclosure, an expression "or" includes any combination or the entire combination of together listed words. An expression of a first and a second in the present disclosure may represent various elements of the present disclosure, but does not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" electrically or physically to the other element, or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When used in a description of the present disclosure and the appended claims, a singular form encompasses a plurality of forms unless it is explicitly differently represented.

Unless differently defined herein, terms including technical terms and scientific terms used here have the same meaning as that may be generally understood by a person of common skill in the art.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), just to name a few non-limiting possibilities.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, just to name a few non-limiting possibilities.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, just to name a few non-limiting possibilities.

According to some embodiments, an electronic device may be furniture, or part of a building, or a construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As understood by those skilled in the art, the above-mentioned electronic devices are exemplary only and not to be considered as a limitation of this disclosure.

FIG. 1 is a signal flow diagram illustrating a wireless network environment and method, in which a wireless relay device 100 according to various embodiments of the present disclosure. The method may approximate and update an approximate location information of the relay device 100 by using the location information of at least one electronic device, and may transmit the updated location information thereof to the electronic device. For example, relay device 100 may not have its own GPS receiver, and thus it may be desirable for relay device 100 to obtain its own location by other means. Once relay device 100 obtains an approximated location, it may be provided to other devices which are connectable to relay device 100 but also lack an independent means of obtaining location information.

The wireless network environment may include the wireless relay device 100, a first electronic device 101, a second electronic device 102, and a third electronic device 103. The wireless relay device 100 may be a device that supports wireless data communication by at least one electronic device located within the network range of the wireless relay device 100. The wireless relay device 100 may be, for example, a Wireless Access Point (WAP). Although relay device 100 is said to be a "wireless relay device" by having the capability to communicate wirelessly with other devices, it may have a wired connection to an Internet server via a transmission line cable. Alternatively, the relay device 100 may be connected to the Internet wirelessly. Note that while relay device 100 is depicted in FIG. 1 as having a configuration of a typical fixed access point or wireless router, it may have other forms, e.g., it may be embodied as a smart phone or any other type of electronic device as discussed above. To approximate and update its own location information, wireless relay device 100 may receive the location information of at least one electronic device, which is located within the network range of the wireless relay device 100, from the electronic device. For example, wireless relay device 100 may receive (operation 111) the location information of the first electronic device 101 from the first electronic device and receive (operation 113) the location information of the second electronic device 102 from the second electronic device. The location information of the first and second devices 101, 102 may each include Global Positioning System (GSP) location information. The GPS location information is a value indicating latitude and longitude, and may correspond to particular address information. For example, when GPS location information indicates 37°4807776'N, 126°8820139'E, the GPS location information may correspond to "1-1, Gasan-dong, Geumcheon-gu, Seoul, Korea."

The at least one electronic device may transmit, to the wireless relay device 100, the location information of the electronic device and a time at which the location information has been updated. For example, when the first electronic device 101 updated the location information thereof by using a GPS module at 13:00:00 on Jan. 1, 2014, the first electronic device 101 may transmit, to the wireless relay device 100, the location information thereof and the latest update time (13:00:00 on Jan. 1, 2014) together. The wireless relay device 100 may determine whether the received location information of the first and second devices 101, 102 is suitable for acquiring (i.e., approximating, in this case) the location information of wireless relay device 100. Specifically, the wireless relay device 100 may evaluate (operation 115) the reliability of the received location information from each of the first and second electronic devices 101, 102. The wireless relay device 100 may utilize at least one defined criterion for determining whether the location information of an electronic device corresponds to reliable location information. If the location information meets the criterion (or criteria), it may herein be considered that the "reliability has been confirmed" for such location information, or the location information has a "confirmed reliability".

According to various embodiments of the present disclosure, the wireless relay device 100 may determine the location information of an electronic device, which has been updated after a predetermined time, to be location information of which the reliability has been confirmed. For example, a case is considered in which the wireless relay device 100 set 09:00:00 on Jan. 1, 2015 as a predetermined time. In this case, when the location information of the first electronic device 101 was updated at 13:00, 1 Jan. 2015, the wireless relay device 100 may determine the location information of the first electronic device 101 to be location information of which the to reliability has been confirmed. Conversely, when the location information of the second electronic device 102 was updated at 08:00, 1 Jan. 2015, the wireless relay device 100 may determine the location information of the second electronic device 102 to be location information of which the reliability has not been confirmed.

The wireless relay device 100 may update the predetermined time at predetermined intervals and determine the latest updated location information of an electronic device to be location information of which the reliability has been confirmed. For example, when a current time is 06:00:00 on Jan. 1, 2015, the predetermined time was 03:00:00 on Jan. 1, 2015, and the predetermined time is set to be updated every 24 hours, the predetermined time may be updated to 03:00:00 on Jan. 2, 2015 at 06:00:00 on Jan. 2, 2015. The predetermined time and the update interval may be set by receiving an input from a user or may be set by the manufacturer of the wireless relay device.

According to various embodiments, the wireless relay device 100 may determine the location information of an electronic device, which is included in the range of a predetermined location, to be location information of which the reliability has been confirmed. The predetermined location may be set by using the Internet Protocol (IP) address information of the wireless relay device 100. For example, a case is considered in which the IP address of the wireless relay device 100 is 128.96.38.3. When a communication service provider allocates 128.96.38.1 to 128.96.38.127 as the range of IP address information of Gangnam-gu, Seoul, Korea, the wireless relay device 100 may set Gangnam-gu as a predetermined location. The wireless relay device 100 may know region information, which matches IP address information, by using a default router (not shown) connected to the wireless relay device 100. For example, the router may store IP address information on a region, over which the router has control, and region information corresponding to the IP address information. Also, when the wireless relay device 100, which is connected to the router, requests region information which matches the IP address information of the wireless relay device 100, the router may transmit the corresponding region information. The wireless relay device 100 may determine the location information of an electronic device, which is included in the range of a predetermined location, to be location information of which the reliability has been confirmed. For example, a case is considered in which Gangnam-gu is set as a predetermined location, the GPS location information of the first electronic device 101, which is received from the first electronic device 101, is 1-1, Seocho-dong, Gangnam-gu, and the GPS location information of the second electronic device 102 is 1-1, Hannam-dong, Yongsan-gu. In this case, since the location information of the first electronic device 101 is within the range of Gangnam-gu, the wireless relay device 100 may determine the location information of the first electronic device 101 to be location information of which the reliability has been confirmed. Conversely, since the location information of the second electronic device 102 is not within the range of Gangnam-gu, the wireless relay device 100 may determine the location information of the second electronic device 102 to be location information of which the reliability has not been confirmed.

The wireless relay device 100 may update (operation 117) its location information by using the location information, of which the reliability has been confirmed, of an electronic device. For instance, wireless relay device 100 may set the latest updated location information of an electronic device as its own (approximated/estimated) location information. For example, when there is at least one part of the location information, of which the reliability has been confirmed, of an electronic device, the wireless relay device 100 may set the latest updated location information among the at least one part of location information as the location information of the wireless relay device 100. (In some cases, location information may be confirmed even if only a portion of the location information of an electronic device is provided to wireless relay device 100.)

The wireless relay device 100 according to various embodiments may update its location information by calculating the arithmetic average of at least one part of location information of which the reliability has been confirmed from multiple devices. For example, when the GPS location information of the first electronic device 101 is 37°4807776'N, 126°8820139'E and the GPS location information of the second electronic device 102 is 37°4852728'N, 126°8798253'E, the wireless relay device 100 may acquire the location information of (37°4807776'+37°4852728')/2N, (126°8820139'+126°8798253')/2E by calculating the average of each of latitude and longitude. The wireless relay device 100 may set the acquired location information as the location information of the wireless relay device 100.

Once wireless relay device 100 update its location information using any of the techniques as described above, it may store the updated location information. When a new electronic device enters the range of a wireless network of the wireless relay device 100, the wireless relay device 100 may receive (operation 119) a location information request message, which requests the location information of the wireless relay device 100, from the new electronic device which enters the wireless network. For example, when the third electronic device 103 enters the range of a wireless network of the wireless relay device 100, the third electronic device 103 may transmit a location information request message, which requests the location information of the wireless relay device 100, to the wireless relay device 100. The wireless relay device 100 may then transmit (operation 121) its location information to the third electronic device 103 in response to the location information request message. A user of the third electronic device 103 may thereby be apprised of the user's own approximate location information by using the location information of the wireless relay device 100, without using a GPS module or a location information providing server.

Figure 2:
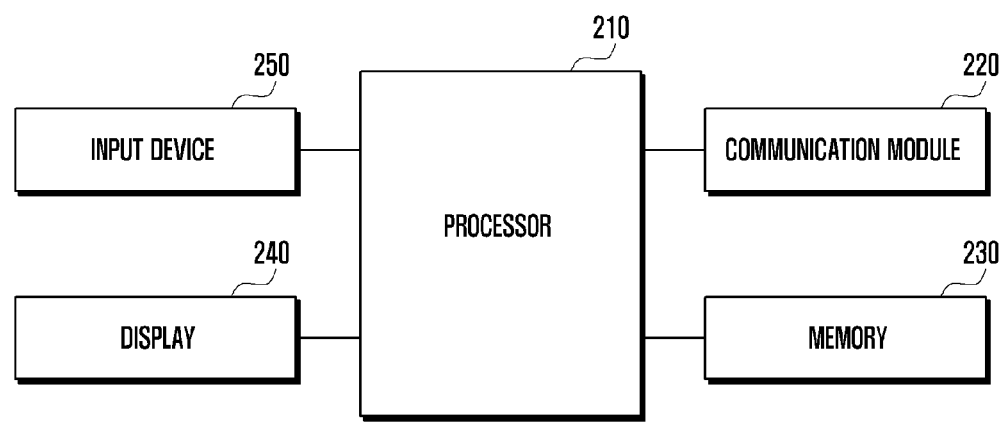
FIG. 2 is a block diagram of an electronic device according to various embodiments of the present disclosure.

FIG. 2 is a block diagram of an electronic device 201 according to various embodiments of the present disclosure. For example, the electronic device 201 may include the whole or a part of the electronic devices 101, 102, or 103 illustrated in FIG. 1. The electronic device 201 may include at least one processor (e.g. an application processor (AP)) 210, a communication module 220, a memory 230, a display 240, and an input device 250.

The processor 210 may control a plurality of hardware or software elements connected to the processor 210 by driving an operating system or an application program, and perform processing of various pieces of data and calculations. The processor 210 may be implemented by, for example, a System on Chip (SoC). According to an embodiment, the processor 210 may further include a Graphic Processing Unit (GPU) and/or an image signal processor. Although shown separate from other components, processor 210 may include at least some (e.g. a cellular module) of the elements illustrated in FIG. 2 in an alternative configuration. The processor 210 may load, into a volatile memory, instructions or data received from at least one of the other elements (e.g., a non-volatile memory) and process the loaded instructions or data, and may store various data in a non-volatile memory.

The processor 210 according to various embodiments may acquire the location information of electronic device 201 by using the location information of the wireless relay device 100 and the intensity of a Wi-Fi signal received from the wireless relay device 100. Specifically, the processor 210 may measure Received Signal Strength Indication (RSSI) value of electronic device 201 and may acquire the location information of device 201 by using the location information of the wireless relay device 100 and the measured RSSI value. For example, when the location information of the wireless relay device 100 indicates x'Ny'E and the RSSI value measured by the electronic device 201 is −61 dBm, the processor 210 sets a location, which is spaced a distance corresponding to −61 dBm apart from x'Ny'E, as the location information of the electronic device 201. The distance may be computed via the RSSI value relative to the power level of the signal transmitted by the relay device 100, which may be known beforehand. As the electronic device 201 comes close to the wireless relay device 100, the RSSI value may approach a maximum level (normalized as 0). In order to acquire the location information of the electronic device 201 by using the location information of the wireless relay device 100 and the RSSI value, the processor 210 may use a Friis formula. For example, when the electronic device 201 is spaced a distance d apart from the wireless relay device 100, the processor 210 may compute a relative location information of the electronic device 201 by using $d=c*10^{L/20}/(4\pi f)$. In the above-mentioned formula, c refers to the transmission speed (the speed of light) of a radio signal, L refers to an RSSI value, and f refers to a frequency, e.g., in a Wi-Fi frequency band. In other words, the processor 210 may compute a distance d between the wireless relay device 100 and the electronic device 201 by using an RSSI value on the basis of the Friis formula. By computing the distance d from the known location of the relay device 100, the processor may conclude that the electronic device is positioned approximately along the circumference of a circle with radius d, where the center of the circle is located at the wireless relay device 100, thereby acquiring an estimated location of electronic device 201. Thus it can be concluded that electronic device 201 is located within or on the approximate boundary of a certain geographical region bounded by the circle. Further, the processor 210 may acquire a more precise location information of the electronic device 201 by using the distance d between the wireless relay device 100 and the electronic device 201, the location information of the wireless relay device 100, and location information of at least two other reference points with corresponding distances known relative to each of the two other reference points. To this end, triangulation or another method may be used to arrive at an accurate location of electronic device 201.

The communication module 220 may be a circuit that transmit/receive data in communication between the electronic device 201 (e.g. the electronic device 101) and other electronic devices (e.g. the wireless relay device 100 or the electronic device 102) connected through a network. The communication module (interchangeably called communication circuit) 220 may include, for example, a cellular module, a Wi-Fi module, a Bluetooth module, a GPS module, an NFC module, and a radio frequency (RF) module.

The cellular module may provide, for example, a voice call, a video call, a text message service, or an internet service through a communication network. According to an embodiment, the cellular module may distinguish and authenticate the electronic device 201 within a communication network by using a subscriber identity module (e.g. a SIM card). According to an embodiment, the cellular module may perform at least a part of functions which the processor 210 may provide. According to an embodiment, the cellular module may include a Communication Processor (CP).

Each of the Wi-Fi module, the Bluetooth module, the GPS module, and the NFC module may include, for example, a processor for processing data which are transmitted/received through a corresponding module. According to an embodiment, at least a part (e.g., two or more) of the cellular module, the Wi-Fi module, the BT module, the GPS module, and the NFC module may be included in one Integrated Chip (IC) or in an IC package.

The RF module may transmit/receive, for example, a communication signal (e.g. an RF signal). The RF module may include, for example, a transceiver, a Power Amp Module (PAM), a frequency filter, a Low Noise Amplifier (LNA), or an antenna. According to another embodiment, at least one among the cellular module, the Wi-Fi module, the Bluetooth module, the GPS module, and the NFC module may transmit/receive an RF signal through a separate RF module.

The communication module 220 according to various embodiments of the present disclosure may receive a location information request message, which requests the location information of the electronic device 201, from the wireless relay device 100. The communication module 220 may transmit the location information message of the electronic device 201 to the wireless relay device 100, in response to the location information request message received from the wireless relay device 100. The location information message of the electronic device 201 may include the location information of the electronic device 201, the RSSI value of the electronic device 201, and information on the time at which the location of the electronic device 201 has been updated. The location information of the electronic device 201 may include GPS location information. The GPS location information is a value indicating latitude and longitude, and may correspond to particular address information. For example, when GPS location information indicates 37°4807776'N, 126°8820139'E, the GPS location information may corresponds to "1-1, Gasan-dong, Geumcheon-gu, Seoul, Korea." The RSSI value of the electronic device 201 may be a value that numerically expresses the intensity of a signal which the electronic device 201 receives from a wireless relay device 100. The information on the time at which the location of the electronic device 201 has been updated may indicate the time at which the location information of the electronic device 201 has been finally updated. The communication module 220 may transmit a probe request frame, which includes the location information message of the electronic device 201, over respective frequency channels. The probe request frame may be a management frame that the electronic device 201 transmits over each of a number of scanning frequency channels, in order to actively search for the wireless relay device 100. Meanwhile, when the communication module 220 cannot provide the location information of the electronic device 201, the communication module 220 may transmit, to the wireless relay device 100, a message that the location information cannot be provided.

The communication module 220 according to various embodiments of the present disclosure may transmit a location information request message, which requests the location information of the wireless relay device 100, to the wireless relay device 100, in order to acquire an approximate location information of the electronic device 201. The wireless relay device 100 may transmit a location information message in response to the request message, the location information message including the location information of the wireless relay device 100. The communication module 220 may receive this location information message. The location information of the wireless relay device 100 may include GPS location information.

In an alternative approach, the communication module 220 may receive a location information message of the wireless relay device 100 from the wireless relay device 100, the message being included in a beacon frame. The beacon frame may be a broadcasting frame through which the wireless relay device 100 periodically notifies other devices of the presence of a network of the wireless relay device 100. The communication module 220 according to various embodiments of the present disclosure may receive a probe response frame, which includes the location information message of the wireless relay device 100, from the wireless relay device 100. The probe response frame is a frame that the wireless relay device 100 transmits in response to the probe request frame and the electronic device 201 may use the probe response frame in order to discover the wireless relay device 100.

The memory 230 may include, for example, an internal or external memory. The internal memory 230 may include, for example, at least one of a volatile memory (e.g. a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g. an NAND flash memory or an NOR flash memory), a hard drive, or a Solid State Drive (SSD)).

The external memory may further include a flash drive, for example, a Compact Flash (CF), a Secure Digital (SD), a Micro Secure Digital (Micro-SD), a Mini Secure Digital (Mini-SD), an eXtreme Digital (xD), MultiMediaCard (MMC), a memory stick, or the like. The external memory may be functionally and/or physically connected to the electronic device 201 through various interfaces.

The memory 230 according to various embodiments of the present disclosure may store the location information of the electronic device 201, which is included in the location information message of the electronic device 201, the RSSI value of the electronic device 201, and the electronic device 201 location update time information. The memory 230 may store the location information of the wireless relay device 100, which is received from the wireless relay device 100. The memory 230 may store the location information of the electronic device 201, which may be derived by using the location information of the wireless relay device 100.

Examples of the display 240 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 240, for example, may display various types of contents (e.g. texts, images, videos, icons, or symbols) for the user. The display 240 may include a touch screen and receive, for example, a touch, gesture, proximity, or hovering input using an electronic pen or the user's body part. The display 240 may include a panel, a hologram device, or a projector. The panel may be implemented, for example, to be flexible, transparent, or wearable. The panel may be configured with a touch panel and a module. The hologram device may show a three dimensional image in the air by using the interference of light. The projector may display an image by projecting light on a screen. The screen may be located, for example, inside or outside the electronic device 201. According to an embodiment, the display may further include a control circuit for controlling a panel, a hologram device, or a projector.

The input device 250 may include, for example, a touch panel, a (digital) pen sensor, a key, or an ultrasonic input device. The touch panel may use, for example, at least one of a capacitive scheme, a resistive scheme, an infrared light scheme, and an ultrasonic scheme. Also, the touch panel may further include a control circuit. The touch panel may further include a tactile layer to provide a tactile reaction to a user.

The (digital) pen sensor may be, for example, a part of the touch panel or include a separate sheet for recognition. The key may include, for example, a physical button, an optical key, or a keypad. The ultrasonic input device may sense an ultrasonic wave generated from an input tool through a microphone (e.g. a mike) and confirm data corresponding to the sensed ultrasonic wave.

Figure 3A:
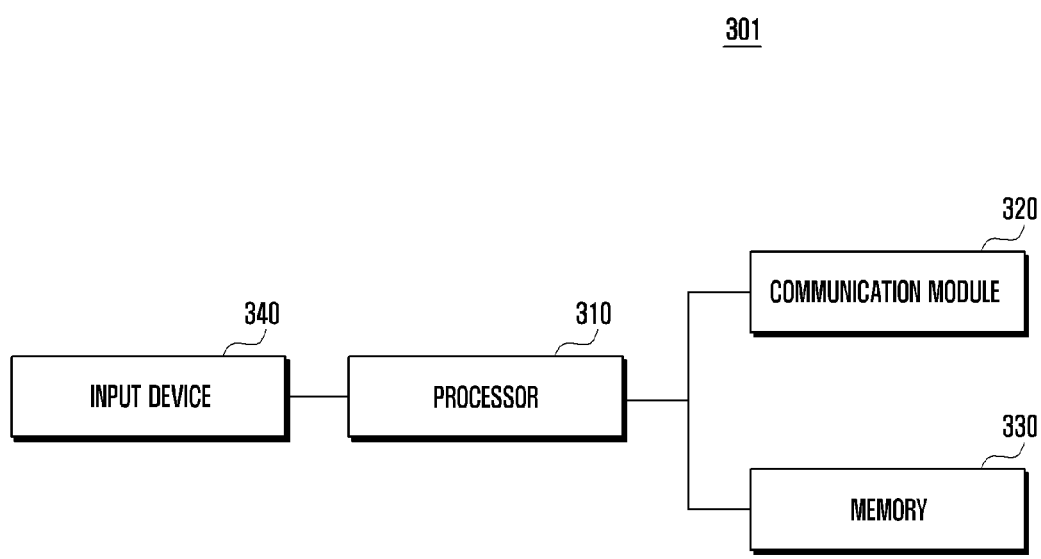
FIG. 3A is a block diagram of a wireless relay device according to various embodiments of the present disclosure.

FIG. 3A is a block diagram of a wireless relay device 301 according to various embodiments of the present disclosure. The wireless relay device 301 may be a device that supports wireless data communication by at least one electronic device located within the network range of the wireless relay device 301. The wireless relay device 301 may include a Wireless Access Point (WAP). For example, the wireless relay device 301 may include the whole or a part of wireless relay device 100 illustrated in FIG. 1. The wireless relay device 301 may include at least one processor (e.g. an application processor (AP) 310, a communication module 320, a memory 330, and an input device 340.

The processor 310 may control, for example, a plurality of hardware or software elements connected to the processor 310 by driving an operating system or an application program, process various data, and perform calculations. The processor 310 may be implemented by, for example, a System on Chip (SoC). According to an embodiment, the processor 310 may further include a Graphic Processing Unit (GPU) and/or an image signal processor. The processor 310 may include at least some (e.g. a communication module) of the elements illustrated in FIG. 3. The processor 310 may load, into a volatile memory, instructions or data received from at least one of the other elements (e.g., a non-volatile memory) and process the loaded instructions or data, and may store various data in a non-volatile memory. The communication module (interchangeably called communication circuit) 320 may transmit/receive data in communication between the wireless relay device 301 (e.g. the wireless relay device 100) and other electronic devices (e.g. the electronic device 101) connected through a network. The communication module 320 may include, for example, a cellular module, a Wi-Fi module, a Bluetooth module, a GPS module, an NFC module, and a radio frequency (RF) module.

The cellular module may provide, for example, a voice call, a video call, a text message service, or an internet service through a communication network. According to an embodiment, the cellular module may distinguish and authenticate the electronic device 201 within a communication network by using a subscriber identity module (e.g. a SIM card). According to an embodiment, the cellular module may perform at least a part of functions which the processor 210 may provide. According to an embodiment, the cellular module may include a Communication Processor (CP).

Each of the Wi-Fi module, the Bluetooth module, the GPS module, and the NFC module may include, for example, a processor for processing data which are transmitted/received through a corresponding module. According to an embodiment, at least a part (e.g. two or more) among the cellular module, the Wi-Fi module, the BT module, the GPS module, and the NFC module may be included in one Integrated Chip (IC) or in an IC package.

The RF module may transmit/receive, for example, a communication signal (e.g. an RF signal). The RF module may include, for example, a transceiver, a Power Amp Module (PAM), a frequency filter, a Low Noise Amplifier (LNA), or an antenna. According to another embodiment, at least one among the cellular module, the Wi-Fi module, the Bluetooth module, the GPS module, and the NFC module may transmit/receive an RF signal through a separate RF module.

The communication module 320 according to various embodiments of the present disclosure may transmit a location information request message, which requests the location information of the electronic device 201, to the electronic device 201. The communication module 320 may receive a location information message, which includes the location information of the electronic device 201, from the electronic device 201 in response to the location information request message. When the electronic device 201 cannot provide its location information in response to the location information request message, the communication module 320 may receive, from the electronic device 201, a message that the location information cannot be provided. Although the communication module 320 does not transmit the location information request message to the electronic device 201, the communication module 320 may receive a probe request frame, which includes the location information message of the electronic device 201, from the electronic device 201. The probe request frame may be a management frame that the electronic device 201 transmits over each of a number of scanning frequency channels, in order to actively search for the wireless relay device 301.

The communication module 320 according to various embodiments of the present disclosure may transmit, to the electronic device 201, the location information of the wireless relay device 301 which is acquired by using the location information of at least one electronic device. The location information of the wireless relay device 100 may include GPS location information. The GPS location information is a value indicating latitude and longitude, and may correspond to particular address information. For example, when GPS location information indicates 37°4807776'N, 126°8820139'E, the GPS location information may corresponds to "1-1, Gasan-dong, Geumcheon-gu, Seoul, Korea." The communication module 320 may receive a location information request message, which requests the location information of the wireless relay device 100, from the electronic device 201. The communication module 320 may transmit the location information of the wireless relay device 301 to the electronic device 201 in response to the location information request message. The communication module 320 according to various embodiments of the present disclosure may include a location information message of the wireless relay device 301 in a beacon frame, and transmit the beacon frame to the electronic device 201 at predetermined intervals. The beacon frame may be a broadcasting frame through which the wireless relay device 301 periodically notifies other devices of the presence of a network of the wireless relay device 301. The communication module 320 according to various embodiments of the present disclosure may include a location information message of the wireless relay device 301 in a probe response frame, and transmit the probe response frame to the electronic device 201 at predetermined intervals. The probe response frame is a frame that the wireless relay device 301 transmits in response to the probe request frame and the electronic device 201 may use the probe response frame in order to discover the wireless relay device 301.

The memory 330 may include, for example, an internal or external memory. The internal memory may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, an NAND flash memory or an NOR flash memory), a hard drive, a Solid State Drive (SSD)).

The external memory may further include a flash drive, for example, a Compact Flash (CF), a Secure Digital (SD), a Micro Secure Digital (Micro-SD), a Mini Secure Digital (Mini-SD), an eXtreme Digital (xD), MultiMediaCard (MMC), a memory stick, or the like. The external memory may be functionally and/or physically connected to the wireless relay device 301 through various interfaces.

The memory 330 according to various embodiments of the present disclosure may store a location information message of an electronic device 201. The memory 330 may store an information table which includes the location information of the electronic device 201, the RSSI value of the electronic device 201, and electronic device 201 location information update time information. The memory 330 may store a predetermined time and a predetermined location in order to evaluate and confirm the reliability of the location information of an electronic device. The memory 330 may store the location information of the wireless relay device 301 which is acquired by using the location information having a confirmed reliability, of at least one electronic device. When the location information of the wireless relay device 301 is updated, the memory 330 may store the updated location information of the wireless relay device 301 according to the time sequence.

The input device 340 may include, for example, a touch panel, a (digital) pen sensor, a key, or an ultrasonic input device. The touch panel may use, for example, at least one of a capacitive scheme, a resistive scheme, an infrared light scheme, and an ultrasonic scheme. Also, the touch panel may further include a control circuit. The touch panel may further include a tactile layer to provide a tactile reaction to a user.

The (digital) pen sensor may be, for example, a part of the touch panel or include a separate sheet for recognition. The key may include, for example, a physical button, an optical key, or a keypad. The ultrasonic input device may sense an ultrasonic wave generated from an input tool through a microphone (e.g. a mike) and confirm data corresponding to the sensed ultrasonic wave.

The input device 340 according to various embodiments of the present disclosure may receive, from a user, an input relating to a predetermined time and a predetermined location in order to confirm the reliability of the location information of an electronic device. The input device 340 may receive, from the user, an input relating to the update interval of the predetermined time. The input device 340 may receive, from the user, an input relating to initial location information of the wireless relay device 301.

Figure 3B:
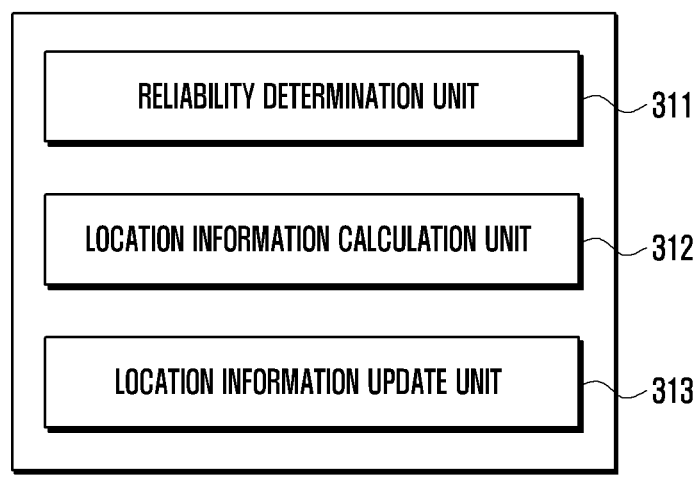
FIG. 3B is a block diagram a processor of a wireless relay device according to various embodiments of the present disclosure.

FIG. 3B is a block diagram of the processor 310 of a wireless relay device 301 according to various embodiments of the present disclosure. Processor 310 may include a reliability determination unit 311, a location information calculation unit 312, and a location information update unit 313.

The reliability determination unit 311 may evaluate and confirm the reliability of the electronic device 201 received from the electronic device 201. The reliability determination unit 311 may utilize at least one criterion for determining whether the location information of an electronic device corresponds to location information which has a confirmed reliability. The reliability determination unit 311 may determine the location information, which has been updated since the predetermined time, of an electronic device to be location information of which the reliability has been confirmed. The reliability determination unit 311 may update the predetermined time at predetermined intervals and determine the latest updated location information of an electronic device to be location information with a confirmed reliability. According to various embodiments of the present disclosure, the reliability determination unit 311 may determine the location information of an electronic device, which is included in the range of the predetermined location, to be location information of which the reliability has been confirmed. The predetermined location may be set by using the Internet Protocol (IP) address information of the wireless relay device 301. For example, a case is considered in which the IP address of the wireless relay device 301 is 128.96.38.3. When a communication service provider allocates 128.96.38.1 to 128.96.38.127 as the range of IP address information on Gangnam-gu, Seoul, Korea, the reliability determination unit 311 may set Gangnam-gu as a predetermined location. The reliability determination unit 311 may know region information, which matches IP address information of the wireless relay device 301, by using a default router connected to the wireless relay device 301. For example, the router may store IP address information on a region, over which the router has control, and region information corresponding to the IP address information. Also, when the wireless relay device 301, which is connected to the router, requests region information which matches to the IP address information of the wireless relay device 301, the router may transmit the corresponding region information to the wireless relay device 301. The reliability determination unit 311 may determine the location information of the electronic device 201, which is included in the predetermined location range, to be location information of which the reliability has been confirmed. The reliability determination unit 311 according to various embodiments of the present disclosure may use the predetermined location range set by a user or the predetermined location range set by the manufacturer of the relay device 301. For example, when a user or a manufacturer has set "1-1, Noryangjin-dong, Dongjak-gu" as a predetermined location, the reliability determination unit 311 may determine the location information of the electronic device 201 to be location information of which the reliability has been confirmed, if the received location information of the electronic device 201 is within "1-1, Noryangjin-dong, Dongjak-gu,"

and may determine the location information of the electronic device 201 to be location information of which the reliability has not been confirmed, if the received location information of the electronic device 201 is not within "1-1, Noryangjin-dong, Dongjak-gu."

The location information calculation unit 312 may acquire the location information of the wireless relay device 301, by using the location information, of which the reliability has been confirmed, of the electronic device 201. The location information calculation unit 312 may calculate the location information of the wireless relay device 301 by calculating the arithmetic average of at least one part of the location information of which the reliability has been confirmed. For example, when the GPS location information of the first electronic device 101 is 37°4807776'N, 126°8820139'E and the GPS location information of the second electronic device 102 is 37°4852728'N, to 126°8798253'E, the location information calculation unit 312 may calculate the location information of the wireless relay device 301 corresponding to (37°4807776'+37°4852728')/2N, (126°8820139'+126°8798253')/2E by calculating the average of each of latitude and longitude.

The location information update unit 313 may set the latest updated location information of the electronic device 201 as the location information of the wireless relay device 301. For example, when there is at least one part of the location information, of which the reliability has been confirmed, of an electronic device, the location information update unit 313 may set, as the current location information of the wireless relay device 301, the latest updated location information of an electronic device among at least one part of location information. The location information update unit 313 according to various embodiments of the present disclosure may set, as the current location information of the wireless relay device 301, the location information acquired by the location information calculation unit 312. The location information update unit 313 may compare the pre-stored location information of the wireless relay device 301 and the acquired location information of the wireless relay device 301. When the acquired location information of the wireless relay device 301 is different from the pre-stored location information of the wireless relay device 301, the location information update unit 313 may set the acquired location information of the wireless relay device 301 as the current location information of the wireless relay device 301.

Figure 4:
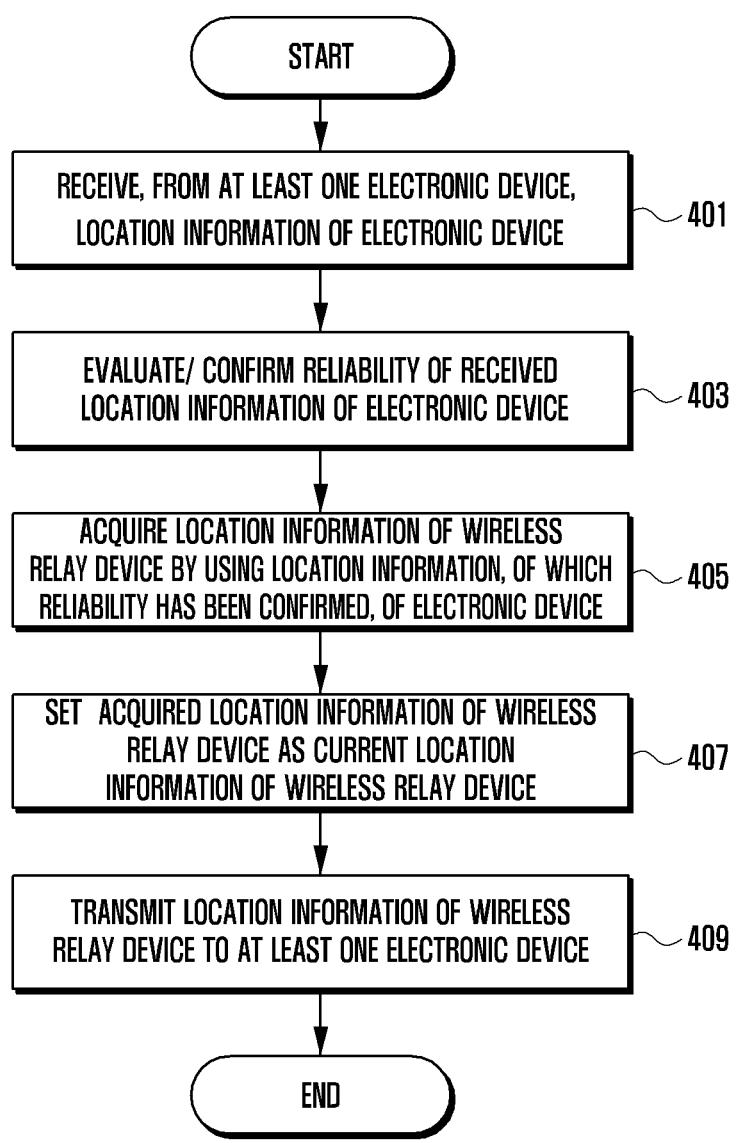
FIG. 4 is a flowchart illustrating an operation in which a wireless relay device according to various embodiments of the present disclosure acquires the location information thereof and provides the location information to an electronic device.

FIG. 4 is a flowchart illustrating an operation in which a wireless relay device 301 according to various embodiments of the present disclosure acquires the location information thereof and provides the location information to an electronic device 201.

Figure 5A:
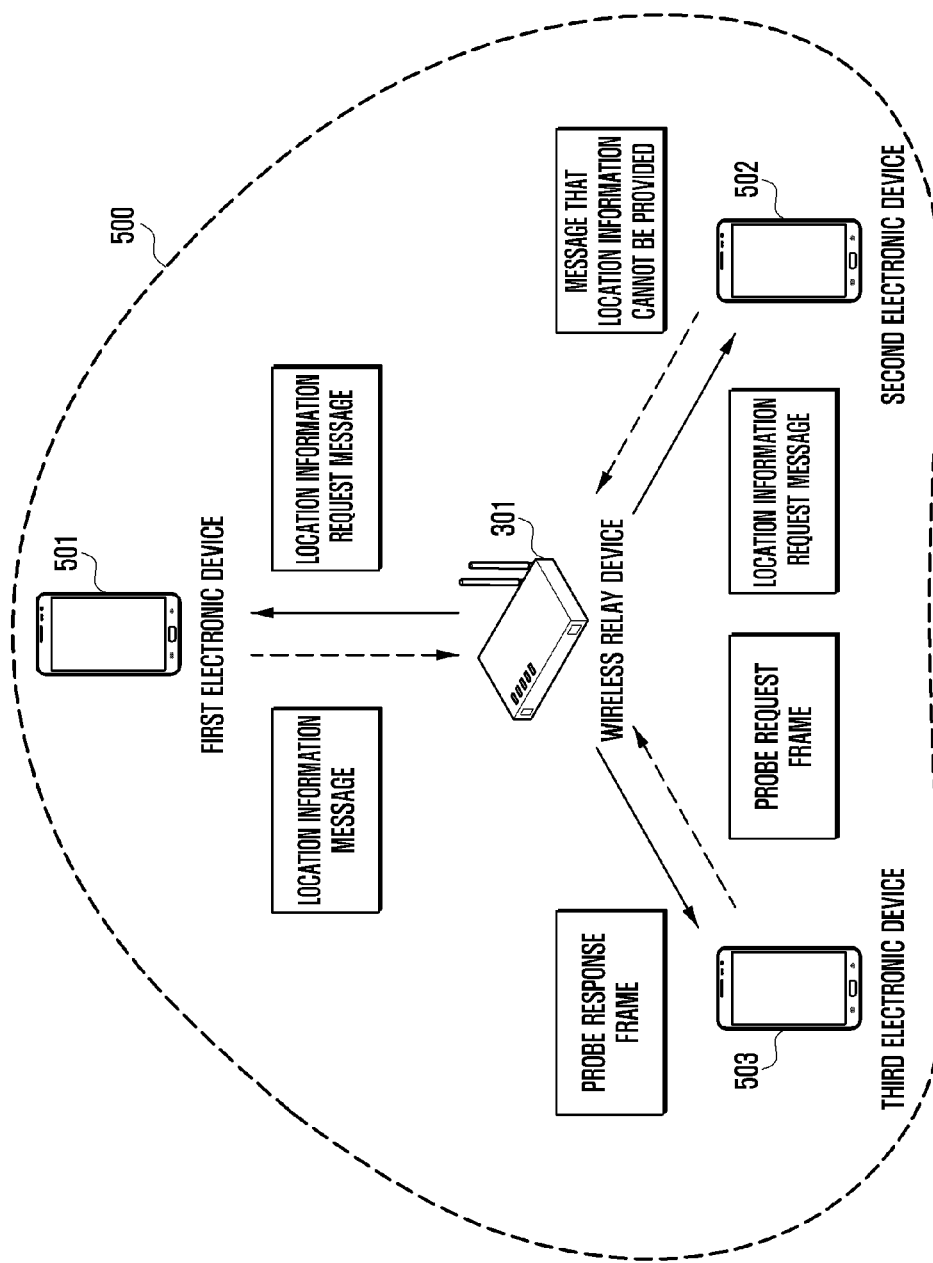
FIG. 5A illustrates an operation in which a wireless relay device according to various embodiments of the present disclosure receives the location information of at least one electronic device, which is located within a wireless network area, from the electronic device.

The wireless relay device 301, in operation 401, may receive a location information message, which includes the location information of the electronic device 201, from at least one electronic device 201. The location information message of the electronic device 201 may include the location information of the electronic device 201, the RSSI value of the electronic device 201, and the electronic device 201 location update time information. The location information of the electronic device 201 may include GPS location information. The RSSI value of the electronic device 201 may be a value that numerically expresses the intensity of a signal which the electronic device 201 receives from the wireless relay device 301. The electronic device 201 location update time information may indicate a time at which the location information of the electronic device 201 has been finally updated. The wireless relay device 301 may transmit a location information request message to the electronic device 201 in order to receive the location information message of the electronic device 201. The electronic device 201 may transmit the location information message, which includes the location information of the electronic device 201, to the wireless relay device 301 in response to the location information request message. For example, referring to FIG. 5A, the wireless relay device 301 may transmit the location information request message to a first electronic device 501 located within a wireless network environment 500. (Electronic devices 501, 502, 503 may each be an example of electronic device 201.) The first electronic device 501 may transmit a location information message, which includes the location information of the first electronic device 501, to the wireless relay device 301 in response to the location information request message.

The wireless relay device 301 according to various embodiments of the present disclosure may receive, from the electronic device 201, a message that location information cannot be provided. For example, referring to FIG. 5A, the wireless relay device 301 may transmit a location information request message to a second electronic device 502 located within the wireless network environment 500. When a GPS module of the second electronic device 502 does not operate or cannot access a location providing server, the second electronic device 502 may transmit, to the wireless relay device 301, a message that location information cannot be provided.

Even when the wireless relay device 301 according to various embodiments of the present disclosure does not transmit a location information request message to the electronic device 201, the wireless relay device 301 may receive a probe request frame, which includes the location information message of the electronic device 201, from the electronic device 201. For example, referring to FIG. 5A, a third electronic device 503 may transmit a probe request frame to the wireless relay device 301 in order to search for a wireless network environment and may include a location information message of the third electronic device 503 in the probe request frame. The wireless relay device 301 may receive, from the third electronic device 503, the probe request frame including the location information message of the third electronic device 503. The wireless relay device 301 may transmit a probe response frame to the third electronic device 503 in response to the probe request frame.

Figure 5B:
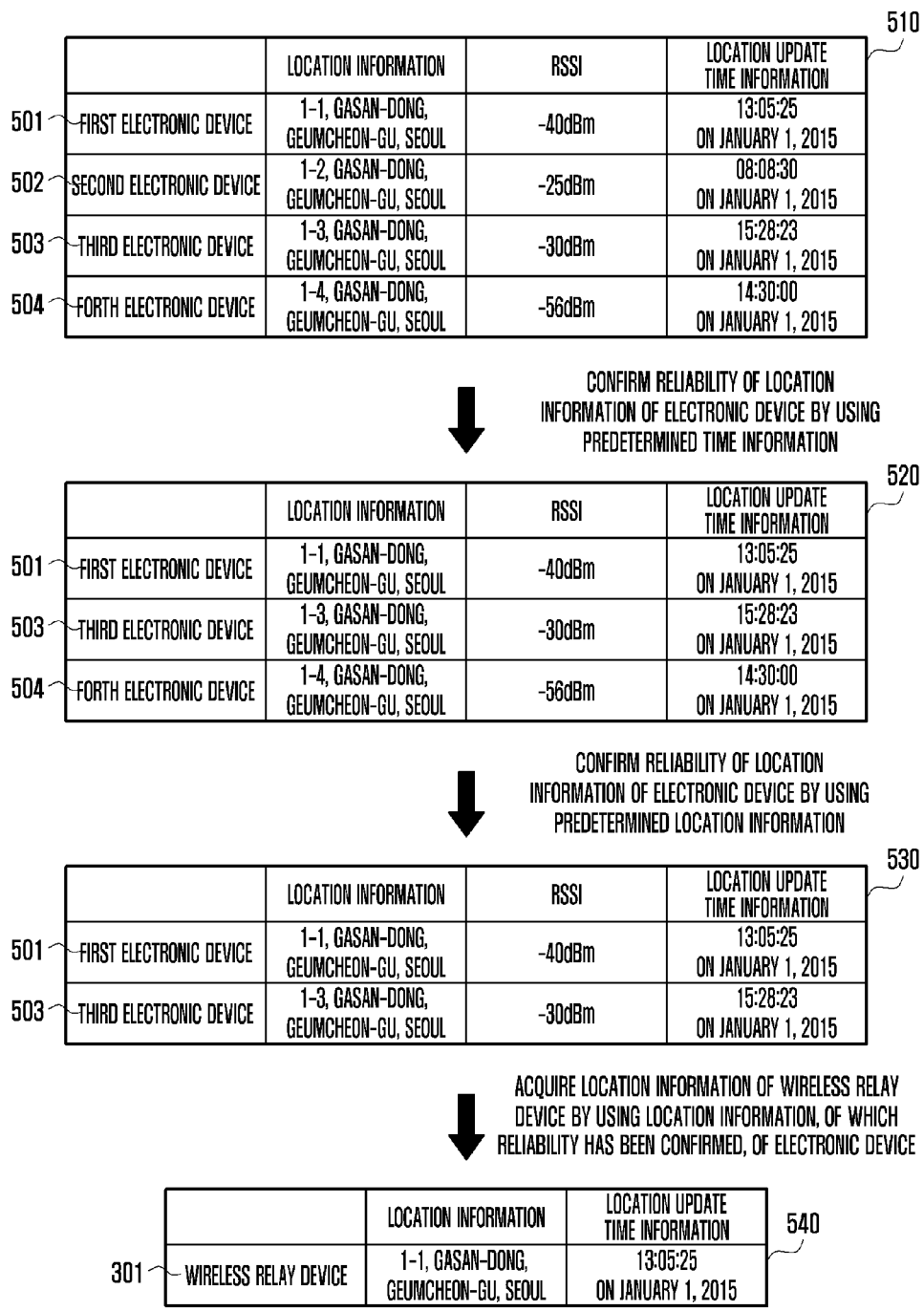
FIG. 5B illustrates an operation in which a wireless relay device according to various embodiments of the present disclosure generates a location information table including the reliable location information of an electronic device, and acquires the location information of the wireless relay device by using the location information table.

The wireless relay device 301 according to various embodiments of the present disclosure may generate a location information table by using a location information message received from the electronic device 201. For example, referring to FIG. 5B, the wireless relay device 301 may receive, from the first electronic device 501, a location information message which includes location information corresponding to "1-1, Gasan-dong, Geumcheon-gu, Seoul", an RSSI value of "−40 dBm", and location update time information corresponding to "13:05:25 on Jan. 1, 2015." The wireless relay device 301 may receive a location information message as described above from the second electronic device 502 to a fourth electronic device 504. The wireless relay device 301 may generate a location information table 510 on the basis of the location information message received from the first electronic device 501 to the fourth electronic device 504. The wireless relay device 301 may store the generated location information table 510 in the memory 330.

The wireless relay device 301, in operation 403, may evaluate, and confirm, if appropriate, the reliability of the received location information of the electronic device 201.

The wireless relay device 301 according to various embodiments of the present disclosure may confirm the reliability of the received location information of the electronic device 201 through the reliability determination unit 311. The wireless relay device 301 may utilize at least one criterion for determining whether the location information of the electronic device 201 corresponds to location information of which the reliability has or has not been confirmed.

According to various embodiments of the present disclosure, the wireless relay device 301 may determine the location information, which has been updated after a predetermined time, of the electronic device 201 to be location information of which the reliability has been confirmed. For example, referring to FIG. 5B, a case is considered in which the wireless relay device 301 sets 09:00:00 on Jan. 1, 2015 as a predetermined time. The wireless relay device 301 may know that the location information of the first electronic device 501, which is included in the location information table 510, has been updated at 13:05:25 on Jan. 1, 2015. The wireless relay device 301 may determine the location information of the first electronic device 501, which has been updated after the predetermined time (09:00:00) to be location information of which the reliability has been confirmed. Similarly, the wireless relay device 301 may know the location update time information of the second electronic device 502 to the fourth electronic device 504 by consulting the location information table 510, and may determine the location information, which has been updated after the predetermined time (09:00:00) of the third electronic device 503 and of the fourth electronic device 504 to be location information of which the reliability has been confirmed. The wireless relay device 301 may extract the location information of the first electronic device 501, of the third electronic device 503, and of the fourth electronic device 504 to generate a location information table 520, the reliability of the location information having been confirmed. The wireless relay device 301 may store the generated location information table 520 in the memory 330. The wireless relay device 301 may update the predetermined time at predetermined intervals and determine the latest updated location information of an electronic device to be location information of which the reliability has been confirmed. For example, when the current time is 06:00:00 on Jan. 1, 2015, the predetermined time is 03:00:00 on Jan. 1, 2015, and the predetermined time is set to be updated every 24 hours, the predetermined time may be updated to 03:00:00 on Jan. 2, 2015 at 06:00:00 on Jan. 2, 2015. The predetermined time and the update interval may be set by receiving an input from a user or at the time of manufacture of the wireless relay device.

According to various embodiments of the present disclosure, the wireless relay device 301 may determine the location information of the electronic device 201, which is included in the predetermined location range, to be location information of which the reliability has been confirmed. The predetermined location may be set by using the Internet Protocol (IP) address information of the wireless relay device 301. For example, a case is considered in which the IP address of the wireless relay device 301 is 128.96.20.3. When a communication service provider allocates 128.96.20.1 to 128.96.20.127 as the range of IP address information on Gasan-dong, Geumcheon-gu, Seoul, Korea, the wireless relay device 301 may set Gasan-dong, Geumcheon-gu as a predetermined location. The wireless relay device 301 may know region information, which matches IP address information, by using a default router connected to the wireless relay device 301. For example, the router may store the IP address information on a region, over which the router has control, and region information corresponding to the IP address information. Also, when the wireless relay device 301, which is connected to the router, requests region information which matches the IP address information of the wireless relay device 301, the router may transmit the corresponding region information. The wireless relay device 301 may confirm the reliability of the location information of an electronic device 201, by using the predetermined location. For example, referring to FIG. 5B, a case is considered in which the wireless relay device 301 sets "Gasan-dong, Geumcheon-gu, Seoul" as a predetermined location. The wireless relay device 301 may confirm that the location information of the first electronic device 501, which is included in the location information table 520, is "1-1, Gasan-dong, Geumcheon-gu, Seoul." The wireless relay device 301 may determine the location information of the first electronic device 501, which is included in the predetermined location (Gasan-dong, Geumcheon-ku), to be location information of which the reliability has been confirmed. Similarly, the wireless relay device 301 may know the location information of the third electronic device 503 and of the fourth electronic device 504 by consulting the location information table 520, and may determine the location information of the third electronic device 503, which is included in the predetermined location (Gasan-dong, Geumcheon-gu), to be location information of which the reliability has been confirmed. The wireless relay device 301 may extract the location information of the first electronic device 501 and of the third electronic device 503 to generate a location information table 530, the reliability of the location information having been confirmed. The wireless relay device 301 may store the generated location information table 530 in the memory 330. The wireless relay device 301 of FIG. 5B confirms the reliability of location information by using a predetermined location after having used a predetermined time, but the present disclosure is not limited thereto. That is, the wireless relay device 301 may determine the reliability of the location information by using the predetermined location and then confirm the reliability of the location information by using the predetermined time. In addition, the wireless relay device 301 may confirm the reliability of the location information by using only one of the predetermined time and the predetermined location.

The wireless relay device 301, in operation 405, may acquire the location information of the wireless relay device 301 by using the location information, of which the reliability has been confirmed, of an electronic device. The wireless relay device 301 according to various embodiments of the present disclosure may calculate the location information of a wireless relay device through the location information calculation unit 312. The wireless relay device 301 may calculate the location information of the wireless relay device 301 by calculating an arithmetic average of the location information of at least one electronic device. For example, referring to the location information table 530 of FIG. 5B, consideration is given to a case where the GPS location information of the first electronic device 501, of which the reliability has been confirmed, is "37°480777'N, 126°8820139'E" and address information corresponding to this is "1-1, Gasan-dong, Geumcheon-gu, Seoul." Further, a case is considered in which the GPS location information of the third electronic device 503, of which the reliability has been confirmed, is "37°4852728'N, 126°8798253'E" and address information corresponding to this is "1-3, Gasan-dong, Geumcheon-gu, Seoul." In this case, the wireless relay device 301 may calculate the location information of the wireless relay device 301, which corresponds to (37°480777'+37°4852728')/2N, (126°8820139'+126°8798253')/2E, by calculating the average of each of the latitude and longitude of the first electronic device 501 and of the third electronic device 503. The wireless relay device 301 may know that the calculated GPS location information corresponds to "2-1, Gasan-dong, Geumcheon-gu, Seoul."

The wireless relay device 301, in operation 407, may update its current location information by using the acquired location information. The wireless relay device 301 according to various embodiments of the present disclosure may update its location information through the location information update unit 313. The wireless relay device 301 may compare pre-stored location information that it may have and the acquired location information of the wireless relay device 301. When the acquired location information is different from the pre-stored location information, the wireless relay device 301 may set the acquired location information of the wireless relay device 301 as its current location information. The wireless relay device 301 according to various embodiments of the present disclosure may set the latest updated location information of the electronic device 201 as the location information of the wireless relay device 301. For example, when there exists at least one part of the location information, of which the reliability has been confirmed, of an electronic device, the wireless relay device 301 may set, as the current location information thereof, the latest updated location information among at least one part of location information. Referring to the location information table 510 of FIG. 5B, since the electronic device 503 location update time information (15:28:23 on Jan. 1, 2015) is most-recently updated, the wireless relay device 301 may set the location information of the third electronic device 503 as the current location information of the wireless relay device 301. The wireless relay device 301 may store updated location information and location update time information in the memory 330. For example, referring to FIG. 5B, when the wireless relay device 301 acquires the location information of "2-1, Gasan-dong, Geumcheon-gu, Seoul" and updates the current location information by the acquired location information at "18:00:00 on Jan. 1, 2015," the wireless relay device 301 may generate a location information table 540 and store the location information of the wireless relay device 301 and the location update time information in the location information table 540.

Figure 5C:
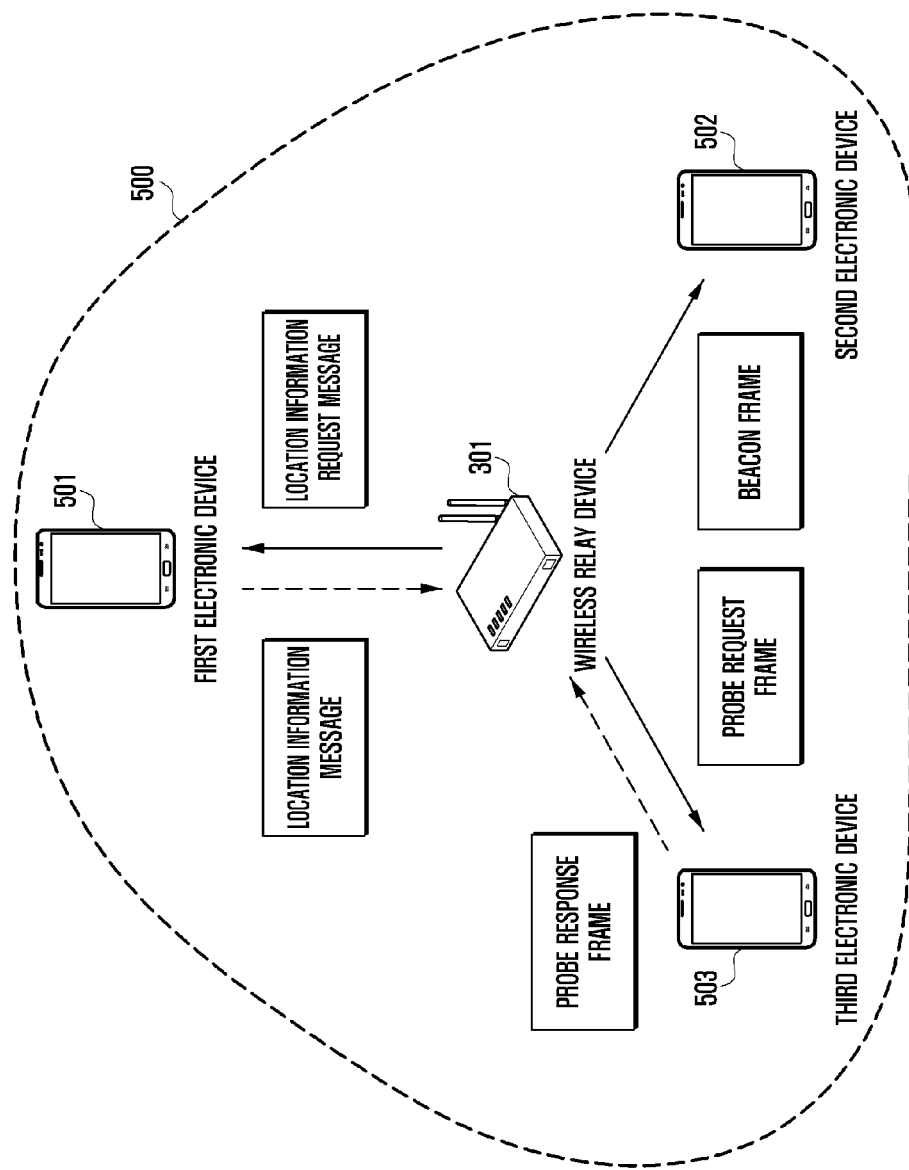
FIG. 5C illustrates an operation in which a wireless relay device according to various embodiments of the present disclosure transmits the location information of the wireless relay device to at least one electronic device, which is located within a wireless network area.

The wireless relay device 301, in operation 409, may transmit a location information message, which includes the location information of the wireless relay device 301, to at least one electronic device. The electronic device 201 may transmit a location information request message to the wireless relay device 301 in order to receive the location information message of the wireless relay device 301. The wireless relay device 301 may transmit the location information message, which includes the location information of the wireless relay device 301, to the electronic device 201 in response to the location information request message. For example, referring to FIG. 5C, the first electronic device 501 located within the wireless network environment 500 may transmit a location information request message to the wireless relay device 301. The to wireless relay device 301 may transmit a location information message, which includes the location information of the wireless relay device 301, to the first electronic device 501 in response to the location information request message.

The wireless relay device 301 according to various embodiments of the present disclosure may include a location information message of the wireless relay device 301 in a beacon frame, and transmit the beacon frame to the electronic device 201 at predetermined intervals. The beacon frame may be a broadcasting frame through which the wireless relay device 301 periodically notifies other devices of the presence of a network of the wireless relay device 301. For example, referring to FIG. 5C, the wireless relay device 301 may transmit a beacon frame including a location information message of the wireless relay device 301 to the second electronic device 502, which is located within the wireless network environment 500, at predetermined intervals.

The wireless relay device 301 according to various embodiments of the present disclosure may include a location information message of the wireless relay device 301 in a probe response frame, and transmit the probe response frame to the electronic device 201. The probe response frame is a frame that the wireless relay device 301 transmits in response to the probe request frame and the electronic device 201 may use the probe response frame in order to discover the wireless relay device 301. For example, referring to FIG. 5C, the third electronic device 503 located within the wireless network environment 500 may transmit a probe request frame to the wireless relay device 301. The wireless relay device 301 may transmit a probe response frame, which includes the location information message of the wireless relay device 301, to the third electronic device 503 in response to the probe request frame.

Figure 6:
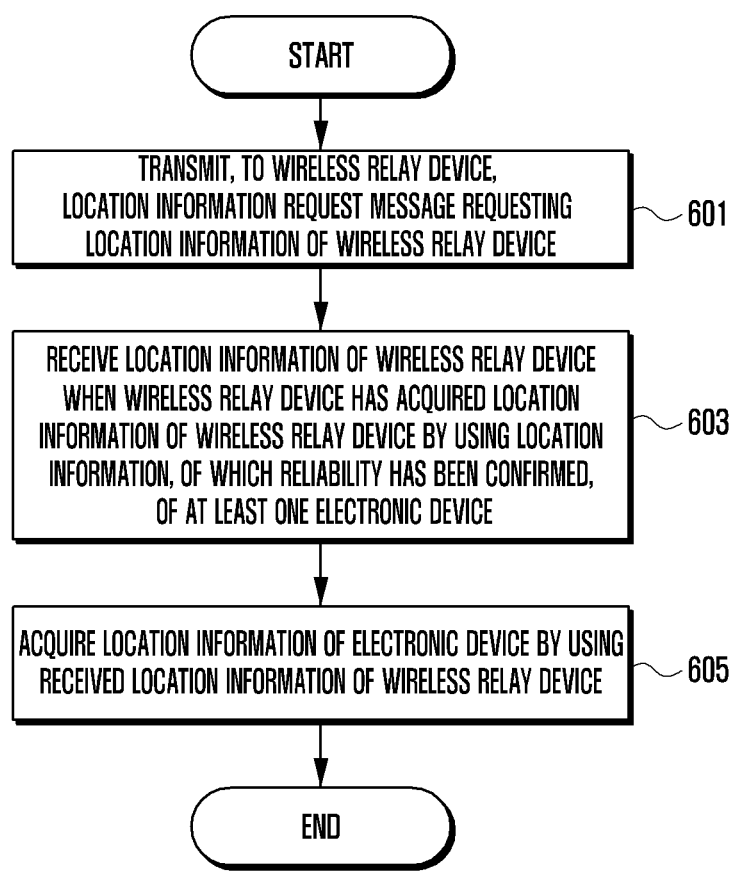
FIG. 6 is a flowchart illustrating an operation in which an electronic device according to various embodiments of the present disclosure acquires the location information of the electronic device by using the location information of a wireless relay device.

FIG. 6 is a flowchart illustrating an operation in which an electronic device 201 according to various embodiments of the present disclosure estimates or acquires the location information thereof by using the location information of the wireless relay device 301.

In operation 601, the electronic device 201 may transmit, to the wireless relay device 301, a location information request message which requests the location information of the wireless relay device 301. When the wireless relay device 301 has received the location information request message from the electronic device 201, the wireless relay device 301 may determine whether it has already acquired and stored its own location information, e.g., using any of the techniques described above (such as by using location information of confirmed reliability acquired from of at least one other electronic device).

When the wireless relay device 301 has already acquired its location information, the electronic device 201, in operation 603, may receive, from the wireless relay device 301, a location information message including the location information of the wireless relay device 301. The electronic device 201 according to various embodiments of the present disclosure may receive a location information message of the wireless relay device 301, which is included in a beacon frame, from the wireless relay device 301 at predetermined intervals. The electronic device 201 according to various embodiments of the present disclosure may receive a location information message of the wireless relay device 301, which is included in a probe response frame, from the wireless relay device 301.

Figure 7:
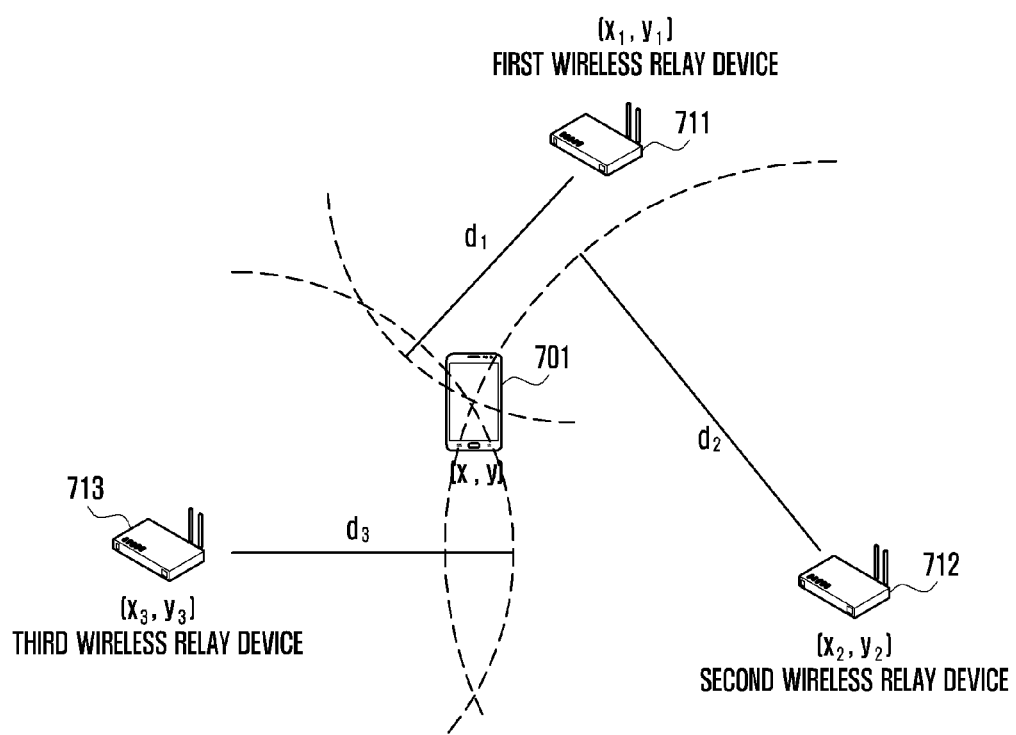
FIG. 7 illustrates an operation in which an electronic device according to various embodiments of the present disclosure acquires the location information of the electronic device by using the location information of a wireless relay device on the basis of a triangulation method.

In operation 605, the electronic device 201 may acquire or estimate the location information of the electronic device 201 by using the received location information of the wireless relay device 301. When the electronic device 201 acquires the location information thereof by using the location information of the wireless relay device 301, the electronic device 201 may quickly acquire its location information without using a GPS module or a location providing server. The electronic device 201 may acquire or estimate the location information thereof by using the location information of the wireless relay device 301 and a measured RSSI value. For example, when the location information of the wireless relay device 301 indicates x'Ny'E and the RSSI value measured by the electronic device 201 is −61 dBm, the electronic device 201 may acquire a location, which is spaced a distance corresponding to −61 dBm apart from x'Ny'E, as the location information of the electronic device 201. Specifically, in order to acquire the location information of the electronic device 201 by using the location information of the wireless relay device 301 and the RSSI value, the electronic device 201 may use a Friis formula. For example, when the electronic device 201 is spaced a distance d apart from the wireless relay device 301, the electronic device 201 may know the location information thereof by using $d=c*10^{L/20}/(4\pi f)$. In the above-mentioned formula, c refers to the transmission speed (the speed of light) of a radio signal, L refers to an RSSI value, and f refers to frequency, e.g., in a Wi-Fi frequency band. In other words, the electronic device 201 may compute a distance d between the wireless relay device 301 and the electronic device 201 by using an RSSI value on the basis of the Friis formula and by knowing the signal power transmitted by the relay device 301 beforehand. Further, the electronic device 201 may acquire or estimate location information of the electronic device 201 by using the distance d between the wireless relay device 301 and the electronic device 201, and the location information of the wireless relay device 301. The estimated location information may correspond to an estimate of being situated approximately along a circumference of a circle with radius d, centered at the location of relay device 301. Moreover, precise location information of electronic device 201 may be acquired by obtaining location information of at least two other reference points and the corresponding distances between electronic device 201 and each of the two other reference points. To this end, triangulation or another method may be used to arrive at the precise estimated location of electronic device 201. When there are at least three wireless relay devices 301, the electronic device 201 according to various embodiments of the present disclosure may acquire more precise location information of the electronic device 201 by using the location information of the at least three wireless relay devices 301 and the measured RSSI value, on the basis of a triangulation method. For example, referring to FIG. 7, an electronic device 701 may calculate a distance d1 by using an RSSI value received from a first wireless relay device 711 on the basis of the Friis formula. The electronic device 701 may calculate a distance d2 by using an RSSI value received from a second wireless relay device 712 on the basis of the Friis formula. The electronic device 701 may calculate a distance d3 by using an RSSI value received from a third wireless relay device 713 on the basis of the Friis formula. The electronic device 701 may use (1) $d1^2=(x-x1)^2+(y-y1)^2$, (2) $d2^2=(x-x2)^2+(y-y2)^2$, and (3) $d3^2=(x-x3)^2+(y-y3)^2$ on the basis of the triangulation method, in order to acquire the location information (x, y) of the electronic device 701. Here, d1 to d3 may refer to distances between the first to third wireless relay devices 711, 712, and 713 and the electronic device 701, respectively; (x1, y1) may refer to the location information of the first wireless relay device 711, (x2, y2) may refer to the location information of the second wireless relay device 712, and (x3, y3) may refer to the location information of the third wireless relay device 713. The electronic device 201 may more accurately acquire the location information thereof by using the location information of the at least three wireless relay devices and the measured RSSI value.

In accordance with the above examples, a method for providing the location information of a wireless relay device according to various embodiments may enable the wireless relay device to acquire the location information of the wireless relay device by using the location information of at least one electronic device located within a wireless network area, without accessing an LIS.

A method for providing the location information of a wireless relay device according to various embodiments may provide, without constructing a centralized system such as an LIS, the location information of the wireless relay device to an electronic device through the wireless relay device, and may allow the electronic device to quickly acquire the location information of the electronic device by using the location information of the wireless relay device.

A method for providing the location information of a wireless relay device according to various embodiments may enable the location information of an electronic device to be acquired by using the location information of a wireless relay device stored in the wireless relay device, even in a state of the absence of an application or the like, which is capable of accessing a location information service, in the electronic device.

A method for providing the location information of a wireless relay device according to various embodiments may enable an electronic device and a wireless relay device to transmit/receive location information through wireless LAN Medium Access Control (MAC) communication, thereby acquiring the location information of the electronic device in a short time and with low electric current consumption.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor", "controller", or "control unit" constitute hardware in the disclosure and appended claims that contain circuitry that is configured for operation. Under the broadest reasonable interpretation, the appended claims constitute statutory subject matter in compliance with 35 U.S.C. § 101 and none of the elements are software per se. The term "module" as used in this application refers to the attachable structure of portions of the housing, and such components comprise statutory subject matter.

The definition of the term "module" as referred to herein is to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and does not constitute software per se.

The embodiments disclosed in the present specifications and drawings were provided merely to readily describe and to facilitate a thorough understanding of the present disclosure but not intended to limit the scope of the claimed subject matter. Therefore, it should be construed that, in addition to the embodiments disclosed herein, all modifications and changes or modified and changed forms derived from the technical idea of the present disclosure fall within the scope of the claimed subject matter as defined by the appended claims.

What is claimed is:

1. A wireless relay device comprising:
   a communication circuit that receives, from at least one external mobile electronic device, a location information message including GPS measured location information of the external mobile electronic device and information on a time at which the location of the external mobile electronic device has been measured; and
   a processor configured to determine that reliability of the received GPS measured location information of the external mobile electronic device, wherein the GPS measured location information of the external mobile electronic device is confirmed if the GPS measured location information of the external mobile electronic device satisfies at least one defined criterion, and if the reliability is confirmed, approximates location information of the wireless relay device by using the GPS measured location information with confirmed reliability, of the external mobile electronic device,
   wherein the at least one criterion involves a predetermined time for a GPS measurement, wherein the processor identifies whether the time that the location of the external mobile electronic device was measured is after the predetermined time based on the information on the time at which the location of the external mobile electronic device has been measured, and determines that the reliability is confirmed when the time that the location of the external mobile electronic device was measured is after the predetermined time; and
   wherein the communication circuit transmits a beacon frame including a location information message, which includes the approximated location information of the wireless relay device, to a further external mobile electronic device located within a network area of the wireless relay device at predetermined intervals.

2. The wireless relay device of claim 1, wherein the communication circuit transmits, to the at least external mobile one electronic device, a location information request message that requests the GPS measured location information of the external mobile electronic device, and receives, from the at least one electronic device, the GPS measured location information message of the external mobile electronic device, in response to the transmitted location information request message.

3. The wireless relay device of claim 1, further comprising a memory that stores the GPS measured location information, of which the reliability has been confirmed, of the external mobile electronic device and the approximated location information of the wireless relay device.

4. The wireless relay device of claim 1, further comprising a memory that stores previously approximated location information of the wireless relay device, wherein the processor compares the stored and previously approximated location information of the wireless relay device and currently approximated location information of the wireless relay device, and updates the stored location information of the wireless relay device by the currently approximated location information when the stored location information is different from the currently approximated location information.

5. The wireless relay device of claim 1, wherein the communication circuit receives, from the further external mobile electronic device, a location information request message that requests location information of the wireless relay device, and in response, transmits a location information message of the wireless relay device to the further external mobile electronic device.

6. The wireless relay device of claim 1, wherein the communication circuit transmits, to the further external mobile electronic device, a probe response frame that includes the location information message of the wireless relay device.

7. A system comprising:
   (a) a wireless relay device comprising:
   a communication circuit that receives, from at least one first external mobile electronic device, a location information message including GPS measured location information of the first external mobile electronic device and information on a time at which the location of the external mobile electronic device has been measured; and
   a processor configured to determine that reliability of the received GPS measured location information of the first external mobile electronic device, wherein the GPS measured location information of the external mobile electronic device is confirmed if the GPS measured location information of the external mobile electronic device satisfies at least one defined criterion, and if the reliability is confirmed, approximates location information of the wireless relay device by using the GPS measured location information with confirmed reliability, of the first external mobile electronic device;
   (b) a second external mobile electronic device comprising a communication circuit operable to transmit a location information request message, which requests location information of the wireless relay device, to the wireless relay device, and receive approximated location information of the wireless relay device transmitted in response to the location information request message,
   wherein the at least one criterion involves a predetermined time for a GPS measurement, wherein the reliability is determined to have been confirmed when the time that the location of the first external mobile electronic device was measured is after the predetermined time based on the information on the time at which the location of the external mobile electronic device has been measured, and
   wherein the second external mobile electronic device receives a beacon frame including the location information message, which includes the approximated location information of the wireless relay device, from the communication circuit at predetermined intervals.

8. The system of claim 7, wherein the second external mobile electronic device further comprises a processor that estimates the location information of the second external mobile electronic device by using received location information of a plurality of wireless relay devices and Received Signal Strength Indication (RSSI) based on signal strengths of respective signals received from the plurality of wireless relay devices.

9. A method for approximating location information of a wireless relay device, the method comprising:
receiving by the wireless relay device, from at least one external mobile electronic device, a GPS measured location information of the external mobile electronic device and information on a time at which the location of the external mobile electronic device has been measured;
confirming reliability of the received GPS measured location information of the external mobile electronic device, when the GPS measured location information satisfies at least one defined criterion; and
approximating the location information of the wireless relay device by using the GPS measured location information, of which the reliability has been confirmed, of the external mobile electronic device,
wherein the at least one criterion involves a predetermined time for a GPS measurement, wherein the reliability is confirmed when the time that the location of the external mobile electronic device is after the predetermined time based on the information on the time at which the location of the external mobile electronic device has been measured; and
wherein the wireless relay transmits a beacon frame including a location information message, which includes the approximated location information of the wireless relay device, to a further external mobile electronic device located within a network area of the wireless relay device at predetermined intervals.

10. The method of claim 9, wherein the receiving of the GPS measured location information of the electronic device comprises:
transmitting, to the at least one external mobile electronic device, a location information request message that requests the location information of the electronic device; and
receiving, from the at least one external mobile electronic device, a location information message of the external mobile electronic device, in response to the transmitted location information request message.

11. The method of claim 9, further comprising storing the GPS measured location information, of which the reliability has been confirmed, of the external mobile electronic device, and the approximated location information of the wireless relay device.

12. The method of claim 9, further comprising:
storing previously approximated location information of the wireless relay device and comparing the stored and previously approximated location information and currently approximated location information of the wireless relay device, by the wireless relay device; and
updating the stored location information of the wireless relay device by the currently approximated location information.

13. The method of claim 9, wherein the transmitting of the location information message of the wireless relay device comprises:
receiving, from the further external mobile electronic device, a location information request message that requests location information of the wireless relay device; and
transmitting the location information message of the wireless relay device to the further external mobile electronic device, in response to the received location information request message.

14. The method of claim 9, wherein the transmitting of the location information message of the wireless relay device comprises transmitting, to the further external mobile electronic device, a probe response frame including the location information message of the wireless relay device.

15. A non-transitory computer-readable storage medium having stored therein program instructions, which when executed by a processor of a wireless relay device, cause the wireless relay device to perform a method comprising:
receiving by the wireless relay device, from at least one external mobile electronic device, a GPS measured location information of the external mobile electronic device and information on a time at which the location of the external mobile electronic device has been measured;
confirming reliability of the received GPS measured location information of the external mobile electronic device, when the GPS measured location information satisfies at least one defined criterion; and
approximating the location information of the wireless relay device by using the GPS measured location information, of which the reliability has been confirmed, of the external mobile electronic device,
wherein the at least one criterion involves a predetermined time for a GPS measurement, wherein the reliability is confirmed when the time that the location of the external mobile electronic device is after the predetermined time based on the information on the time at which the location of the external mobile electronic device has been measured; and
wherein the wireless relay transmits a beacon frame including a location information message, which includes the approximated location information of the wireless relay device, to a further external mobile electronic device located within a network area of the wireless relay device at predetermined intervals.

16. The wireless relay device of claim 1, wherein the at least one criterion further involves a predetermined location set using an Internet Protocol (IP) address of the wireless relay device, wherein the reliability is confirmed if the location information of the external mobile electronic device is included in a specific range of the predetermined location.

17. The system of claim 7, wherein the at least one criterion further involves a predetermined location set using an Internet Protocol (IP) address of the wireless relay device, wherein the reliability is confirmed if the location information of the external mobile electronic device is included in a specific range of the predetermined location.

18. The method of claim 9, wherein the at least one criterion further involves a predetermined location set using an IP address of the wireless relay device, wherein the reliability is confirmed if the location information of the external mobile electronic device is included in a specific range of the predetermined location.

19. The wireless relay device of claim 1, wherein the predetermined time is periodically advanced at a frequency determined by a user input.

20. The wireless relay device of claim 1, wherein approximating the location of the wireless relay device further comprises averaging the GPS measured location information with confirmed reliability of two or more mobile electronic devices.

* * * * *